US011491657B2

(12) United States Patent
Li et al.

(10) Patent No.: US 11,491,657 B2
(45) Date of Patent: Nov. 8, 2022

(54) REMOTELY OPERATED PNEUMATIC MANIPULATOR BASED ON KINECT

(71) Applicants: Yuefeng Li, Heilongjiang (CN); Wenyu Feng, Shandong (CN); Hongyu Yu, Shandong (CN)

(72) Inventors: Yuefeng Li, Heilongjiang (CN); Wenyu Feng, Shandong (CN); Hongyu Yu, Shandong (CN)

(*) Notice: Subject to any disclaimer, the term of this patent is extended or adjusted under 35 U.S.C. 154(b) by 357 days.

(21) Appl. No.: 16/874,704

(22) Filed: May 15, 2020

(65) Prior Publication Data
US 2021/0354298 A1 Nov. 18, 2021

(51) Int. Cl.
*B25J 9/16* (2006.01)
*B25J 9/14* (2006.01)
*B25J 15/10* (2006.01)

(52) U.S. Cl.
CPC .......... *B25J 9/1689* (2013.01); *B25J 9/144* (2013.01); *B25J 15/10* (2013.01)

(58) Field of Classification Search
CPC . B25J 9/1689; B25J 9/144; B25J 15/10; B25J 9/142; B25J 15/0009; B25J 9/1697; G05B 2219/40146; G05B 2219/40195
See application file for complete search history.

(56) References Cited

U.S. PATENT DOCUMENTS

| 2017/0144312 | A1* | 5/2017 | Hamdi | A61B 5/7455 |
| 2017/0355084 | A1* | 12/2017 | Chang | B25J 15/0009 |
| 2018/0207814 | A1* | 7/2018 | Lessing | B25J 9/142 |
| 2019/0099899 | A1* | 4/2019 | Miyazaki | B25J 9/1045 |

* cited by examiner

*Primary Examiner* — Kira Nguyen

(57) ABSTRACT

The invention disclosure a remotely operated pneumatic manipulator based on Kinect, comprising Kinect sensor, computer, D/A embedded board, PWM piezoelectric pneumatic ratio valve, pneumatic triad, air compressor, artificial muscle, spring and finger joint, wherein the Kinect sensor is provided on one side of the finger joint, a camera module of the Kinect sensor is faced to the finger joint. The pneumatic humanoid manipulator of the invention has basically the same dimensions as human hands, can achieve human-computer interaction and remotely operation, the transmission structure thereof is novel, simple and compact, the fingers thereon are convenient to control and flexible to move, the finger movement range is large for wide application, moreover, the PWM piezoelectric pneumatic ratio valve is with advantages of fast dynamic response, low cost, strong resistance to noise, and high detection accuracy of Kinect sensor.

4 Claims, 5 Drawing Sheets

REMOTELY OPERATED PNEUMATIC MANIPULATOR BASED ON KINECT

BACKGROUND OF THE INVENTION

1. Field of the Invention

The invention relates to human-computer interaction field, in particular to a remotely operated pneumatic manipulator based on Kinect.

2. Description of the Related Art

With the development of Robotics, the application fields of robots are constantly expanding, the complexity of operation tasks and environment of the robots are also increasing, traditional robot human-computer interaction in the prior art usually adopts operation modes such as joystick or button, which has some disadvantages such as cumbersome operation, long system delay, and etc.

Human joints have excellent characteristics that robots do not have at present, which not only can achieve much more accurate position control, but also has well flexibility. The characteristics are mainly determined by antagonistic muscle drive mode adopted by the joints. The joint-drive mechanism adopted by the prior manipulator has some disadvantages, such as: due to the large number of used mechanisms, a large amount of energy is consumed to overcome the friction between the mechanisms in the transmission process, thereby the energy at the output end is much lower than that at the input end; also, the drive mechanism has complex structure and large external volume, which affects the flexibility of use.

SUMMARY OF THE INVENTION

The invention provides a remotely operated pneumatic manipulator based on Kinect to solve prior technical problems mentioned above.

In order to solve above problems, the invention adopts following technical schemes: a remotely operated pneumatic manipulator based on Kinect, comprising Kinect sensor, computer, D/A embedded board, PWM (Pulse Width Modulation) piezoelectric pneumatic ratio valve, pneumatic triad, air compressor, artificial muscle, spring and finger joint, wherein the Kinect sensor is provided on one side of the finger joint, a camera module of the Kinect sensor is faced to the finger joint, input/output interface of the Kinect sensor is electrically connected to the computer, input interface of the D/A embedded board is electrically connected to the computer, and output interface of the D/A embedded board is electrically connected to one end of proportional amplifier of the PWM piezoelectric pneumatic ratio valve. In addition, the PWM piezoelectric pneumatic ratio valve adopts a three position five-way valve, pneumatic input interface of the PWM piezoelectric pneumatic ratio valve is connected to the pneumatic triad by tube, input interface of the pneumatic triad is connected to the air compressor; moreover, the artificial muscle adopts pneumatic muscle, pneumatic output interface of the PWM piezoelectric pneumatic ratio valve is connected to the artificial muscle by flexible pipe, the other end of the artificial muscle is connected to the finger joint of the manipulator by rope, the spring is arranged in internal groove of the finger joint, two ends of the spring are connected to and fixed with a convex in the groove by compression, each finger joint is independently arranged, and each finger joint is correspondingly equipped with PWM piezoelectric pneumatic ratio valve, artificial muscle, and spring.

Compared to the prior art, the invention has the following advantageous effects: the pneumatic humanoid mechanical arm in the invention has basically the same dimensions as the human hand and has novel transmission structure; further, the structure of the invention is simple and compact, the fingers thereon are convenient to control and flexible to move, the finger movement range is large for wide application; moreover, even if the adapted pneumatic mechanical arm system is leaked, it will not pollute products and environment like a hydraulic system; simultaneously, the invention is not subject to electromagnetic interference, the PWM piezoelectric pneumatic ratio valve has low harmonics, the sine wave is simulated by using the impulse equivalence principle of the inertia element, and the PWM piezoelectric pneumatic ratio valve is with advantages of fast dynamic response, high power factor on power side, relatively simple control circuit, low cost and strong resistance to noise, in addition, each pixel on images returned by the camera using Kinect sensor represents the distance of the point from the camera in mm, thereby the detection accuracy is high.

As an improvement, the finger joints of the pneumatic humanoid manipulator are designed using 3D printing technology, and the manipulator adopts the artificial muscle-FluidicMuscle of Festo.

As an improvement, each finger joint is to provide with a muscle tendon and a spring.

As an improvement, the computer uses ANFIS algorithm, the Kinect sensor, the computer, and the PWM piezoelectric pneumatic ratio valve constitute an overall control system.

BRIEF DESCRIPTION OF ACCOMPANYING DRAWING

Figure 1:
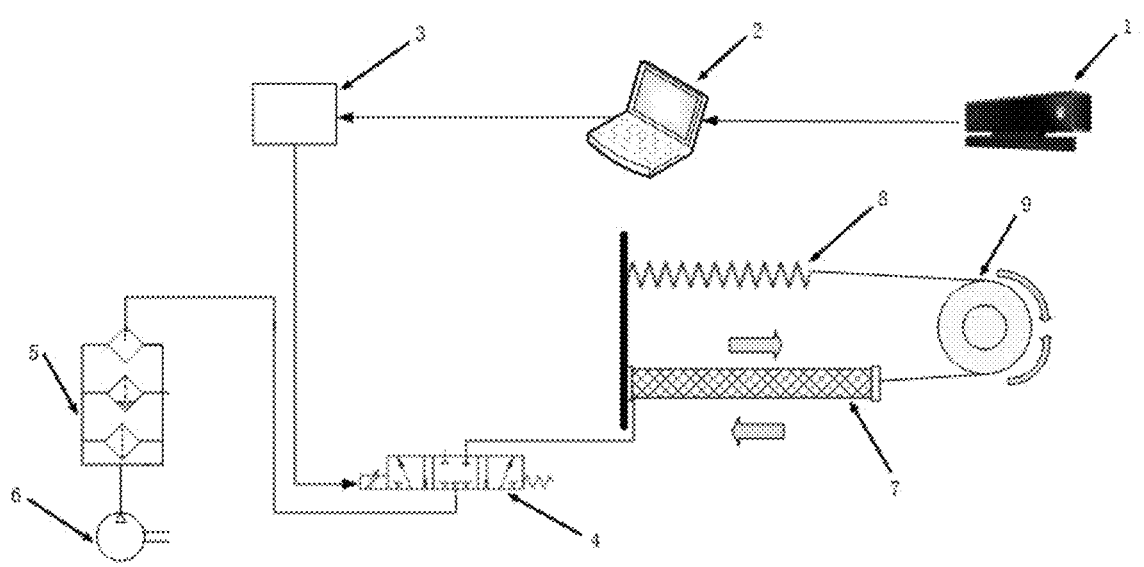
FIG. 1 is a system chart of a remotely operated pneumatic manipulator based on Kinect.
Figure 2:
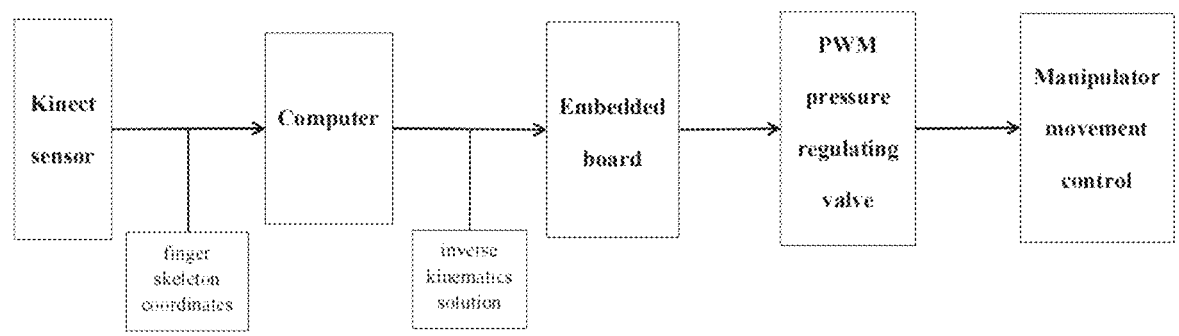
FIG. 2 is a route chart of a remotely operated pneumatic manipulator based on Kinect.
Figure 3:
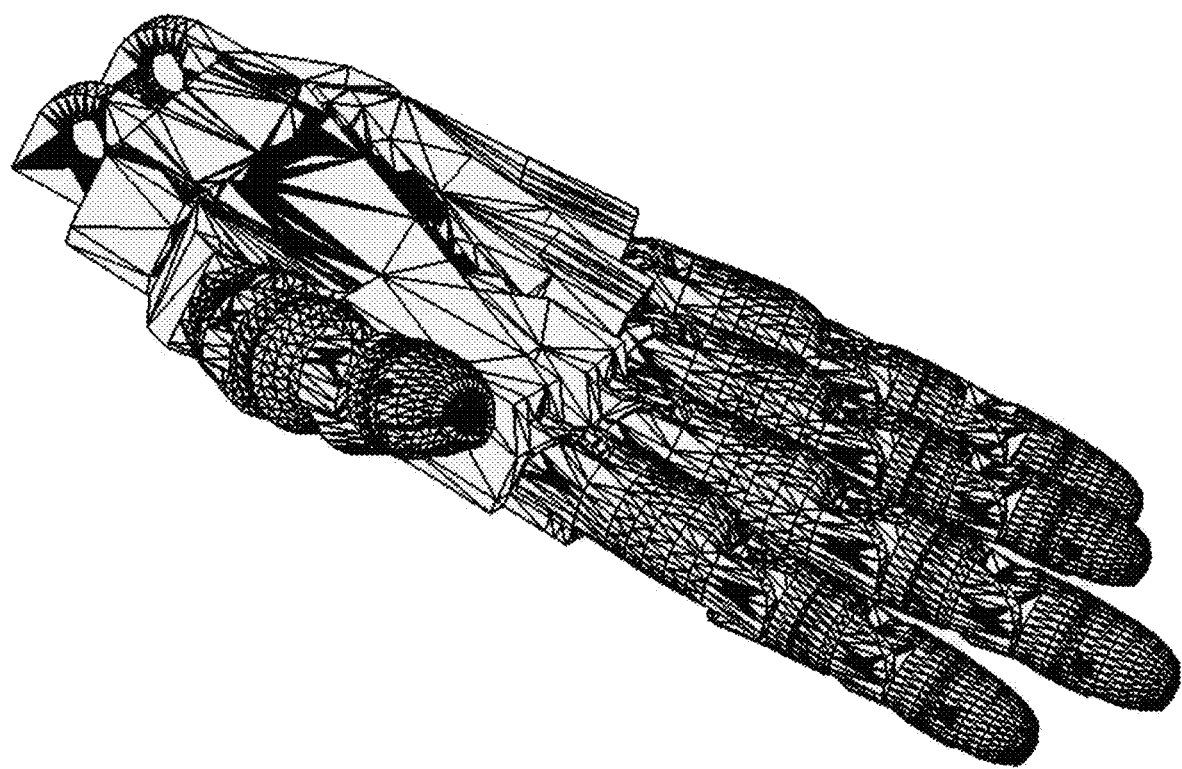
FIG. 3 is a structure diagram showing pneumatic humanoid manipulator of a remotely operated pneumatic manipulator based on Kinect.

In the accompanying drawings: 1 refers to Kinect sensor, 2 refers to computer, 3 refers to D/A embedded board, 4 refers to PWM piezoelectric pneumatic ratio valve, 5 refers to pneumatic triad, 6 refers to air compressor, 7 refers to artificial muscle, 8 refers to spring, 9 refers to finger joint.

DETAILED DESCRIPTION OF THE PREFERRED EMBODIMENTS

The invention is further described in details below with reference to accompanying drawings.

In the specific embodiment of the invention, a remotely operated pneumatic manipulator based on Kinect, comprising Kinect sensor 1, computer 2, D/A embedded board 3, PWM piezoelectric pneumatic ratio valve 4, pneumatic triad 5, air compressor 6, artificial muscle 7, spring 8 and finger joint 9, wherein the Kinect sensor 1 is provided on one side of the finger joint 9, a camera module of the Kinect sensor 1 is faced to the finger joint 9, input/output interface of the Kinect sensor 1 is electrically connected to the computer 2, input interface of the D/A embedded board 3 is electrically connected to the computer 2, and output interface of the D/A embedded board 3 is electrically connected to one end of proportional amplifier of the PWM piezoelectric pneumatic ratio valve 4, the PWM piezoelectric pneumatic ratio valve 4 adopts a three position five-way valve, pneumatic input interface of the PWM piezoelectric pneumatic ratio valve 4 is connected to the pneumatic triad 5 by tube, input interface of the pneumatic triad 5 is connected to the air compressor 6, the artificial muscle 7 adopts pneumatic muscle, pneumatic output interface of the PWM piezoelectric pneumatic ratio valve 4 is connected to the artificial muscle 7 by flexible pipe, the other end of the artificial muscle 7 is connected to the finger joint 9 of the manipulator by rope, the spring 8 is arranged in internal groove of the finger joint 9, two ends of the spring 8 are connected to and fixed with a convex in the groove by compression, each finger joint 9 is independently arranged, and each finger joint 9 is correspondingly equipped with PWM piezoelectric pneumatic ratio valve 4, artificial muscle 7, and spring 8.

The finger joints 9 of the pneumatic humanoid manipulator are designed using 3D printing technology, and the manipulator adopts the artificial muscle-FluidicMuscle of Festo.

Each finger joint 9 is provide with a muscle tendon and a spring 8.

The computer 2 uses ANFIS algorithm, and the Kinect sensor 1, the computer 2, and the PWM piezoelectric pneumatic ratio valve 4 constitute an overall control system.

The operating principle of the invention: the pneumatic humanoid manipulator of the invention is aimed at manufacturing industry, and the parts of the manipulator need to be 3D printed. For most of parts is not standard and are of different shapes, therefore, 3D print technology is needed to make them.

Simultaneously, in the term of Kinect gesture recognition control system, a Kinect-based manipulator is designed to more easily meet the requirements of remote control, thereby the manipulator can be operated in a dangerous or remote situation, also, the use of ANFIS algorithm can effectively solve inverse kinematics, which is good for grasping the manipulator and controlling manipulator to use the artificial muscle—FluidicMuscle of Festo, the D/A embedded board is used to calculate the angles data and input the same into the D/A embedded board, and then connects to PWM pneumatic pressure regulating valve to control the FluidicMuscle to meet movement requirements, moreover, the computer is equipped with an adoptive Network-based Fuzzy Inference System, which is a new type of fuzzy inference system structure that combines fuzzy logic and neuroid organically, adopts a hybrid algorithm of back propagation algorithm and least square method to adjust the prerequisite parameters and conclusion parameters, and can automatically generate If-Then rules. ANFIS (adoptive Network-based Fuzzy Inference System) combines neural network and fuzzy inference organically, which not only exerts the advantages of the two, but also makes up for their respective shortcomings.

The inverse kinematics of the manipulator is solved by ANFIS, the solved inverse kinematics of the manipulator is an approximate solution and the only solution, and other inverse kinematics solutions calculated by cyclic coordinate descent (CCD) algorithm, BFGS algorithm, Jacobian pseudo-inverse and others are mostly not unique solution, thereby the advantages of the algorithm are outstanding.

Figure 4:
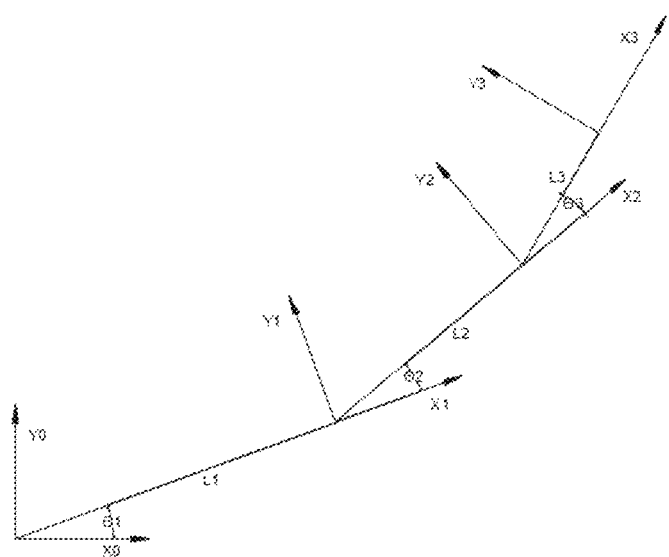
FIG. 4 is a forward kinematics finger coordinate graph of manipulator.
Figure 5:
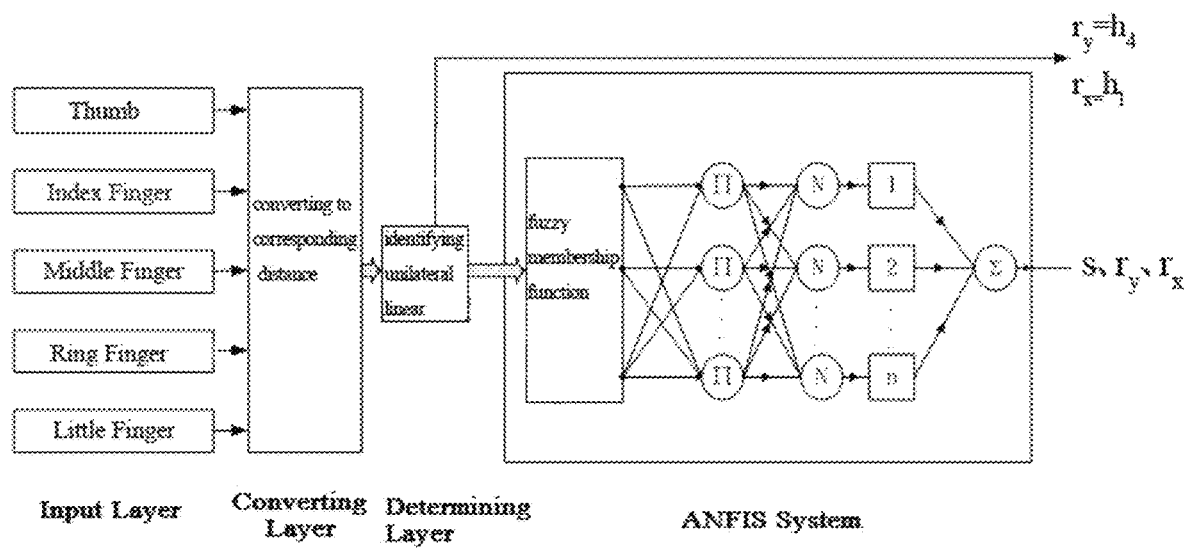
FIG. 5 is a flow block diagram of ANFIS inverse kinematics.

Kinematics analysis of the designed mechanical is the basis, mainly analyzing the relationship between the joint angle of each finger and the final motion coordinates. First, establishing a coordinate system for the fingers, and then performing forward kinematics analysis based on the relationship of the coordinates. The forward kinematics of the manipulator is based on the transformation of the angle to finally get the movement state of the end of the finger. Therefore, taking one finger as an example, the other four fingers are the same. Wherein, the coordinate system of the fingers can be seen in FIG. 4.

The solution of forward kinematics is to find the position coordinates and postures of the end of the finger according to each key angles $\theta_1$, $\theta_2$ and $\theta_3$ of the finger. According to the coordinate relationship of the fingers, it can be seen that the manipulator is a series manipulator, and the coordinates of the fingertip of the manipulator are obtained according to the D-H parameter method of the manipulator. The relevant parameters of the manipulator are shown in Table 1, $\alpha_i$ is the torsion angle of the finger joint i; $l_i$ is the length of the finger joint; $a_i$ is linkage setover on the joint axis i; $\theta_i$ is the angle from the linkage i, wherein i=1, 2, 3;

TABLE 1

Finger Linkage Parameters

| i | $\alpha_i(°)$ | $l_i$(cm) | $a_i$(cm) | $\theta_i(°)$ |
|---|---|---|---|---|
| 1 | 0 | $l_1$ | 0 | $\theta_1$ |
| 2 | 0 | $l_2$ | 0 | $\theta_2$ |
| 3 | 0 | $l_3$ | 0 | $\theta_3$ | using D-H parameter method to following obtain D-H transformation matrix:

$$^0A_1 = \begin{bmatrix} c_1 & -s_1 & 0 & l_1 c_1 \\ s_1 & c_1 & 0 & l_1 s_1 \\ 0 & 0 & 1 & 0 \\ 0 & 0 & 0 & 1 \end{bmatrix}$$

$$^2A_3 = \begin{bmatrix} c_3 & -s_3 & 0 & l_3 c_3 \\ s_3 & c_3 & 0 & l_3 s_3 \\ 0 & 0 & 1 & 0 \\ 0 & 0 & 0 & 1 \end{bmatrix}$$

D-H transforming the established matrix to obtain transformation matrix relative to polar coordinates:

$$^0A_1 = \begin{bmatrix} c_1 & -s_1 & 0 & l_1 c_1 \\ s_1 & c_1 & 0 & l_1 s_1 \\ 0 & 0 & 1 & 0 \\ 0 & 0 & 0 & 1 \end{bmatrix}$$

$$^1A_2 = \begin{bmatrix} c_2 & -s_2 & 0 & l_1 c_1 + l_2 c_2 \\ s_2 & c_2 & 0 & l_1 s_1 + l_2 s_2 \\ 0 & 0 & 1 & 0 \\ 0 & 0 & 0 & 1 \end{bmatrix}$$

$$^2A_3 = \begin{bmatrix} c_3 & -s_3 & 0 & l_1 c_1 + l_2 c_2 + l_3 c_3 \\ s_3 & c_3 & 0 & l_1 s_1 + l_2 s_2 + l_3 s_3 \\ 0 & 0 & 1 & 0 \\ 0 & 0 & 0 & 1 \end{bmatrix}$$

in the matrix, c refers to cos, s refers to sin, and $l_1c_1=l_1 \cos\theta_1$, $l_2c_2=l_2 \cos(\theta_1+\theta_2)$, $l_3c_3=l_3 \cos(\theta_1+\theta_2+\theta_3)$, the coordinates of finger movement can be obtained finally as:

$$x=l_1 \cos\theta_1+l_2 \cos(\theta_1+\theta_2)+l_3 \cos(\theta_1+\theta_2\pm\theta_3)$$

$$y=l_1 \sin\theta_1+l_2 \sin(\theta_1+\theta_2)+l_3 \sin(\theta_1+\theta_2\pm\theta_3)$$

the final coordinates and gestures of finger movement can be obtained by the resulting formula.

The inverse kinematics of the manipulator is to calculate movement angle of each joint of the manipulator according to the last coordinates of the finger, which is essentially the inverse process of the forward kinematics solution. Analyzing based on the coordinates established above, the formula is:

$$T = \begin{bmatrix} c_\partial & -s_\partial & 0 & x \\ s_\partial & c_\partial & 0 & y \\ 0 & 0 & 1 & 0 \\ 0 & 0 & 0 & 1 \end{bmatrix}$$

in the formula, T is transformation matrix, $\partial$ is the azimuth angle of the rod connected to the fingertip with relative to the positive direction of the X axis, according to the matrix, it can be obtained:

$$\begin{cases} c_\partial = c_3 \\ s_\partial = s_3 \\ x = l_1c_1 + l_2c_2 \\ y = l_1s_1 + l_1s_2 \end{cases}$$

the relationship between sines and cosines can be obtained by calculating:

$$c_2 = \frac{x^2 + y^2 - l_1^2 - l_2^2}{2l_1l_2}$$

$$s_2 = \pm\sqrt{1 - c_2^2}$$

$\theta_2=\arctan(s_2,c_2)$ can be calculated based on inverse trigonometric function, and the following can be calculated based on the same calculation method:

$$\theta_1=\arctan 2(y,x)-\arctan 2(l_2s_2,l_1+l_2c_2)$$

finally, the angles of $\partial$ can be obtained by:

$$\partial=\theta_1+\theta_2+\theta_3=\arctan 2(s_\partial,c_\partial)$$

Moreover, the terms "the first" and "the second" are merely used for the description and are not to be understood to indicate and imply the relative importance or implicitly indicate the number of technical features indicated. Thereby, the features defined by "the first", "the second" may comprise one or more of the features, explicitly or implicitly, and in the description of the invention, "multiple" means two or more unless there are clear and specific restrictions.

In the invention, the terms of "arrange", "link", "connect", "fix" and etc., should be understood in broad sense unless there are specific restrictions or stipulations. For example, the term "connect" may refer to fixed connection, detachable connection or integral connection; the "connect" may also refer to mechanical connection or electrical connection; may refer to the mechanically connect or electrically connect, the means of "connect" may be directly or indirectly through an intermediate medium, and may be internal communication between the two elements. For those skilled in the art, the specific meaning of the above terms in the invention can be understood according to the specific situation.

In the invention, unless there are specific restrictions or stipulations, the first feature is "above" or "below" the second feature may include an embodiment where the first feature is in direct contact with the second feature, and may further include an embodiment where the first feature may not be in direct contact with the second feature instead contacting through another feature formed between them. Moreover, the first feature is "upward", "above" and "over" the second feature may include that the first feature is directly above and obliquely above the second feature, or simply means that the horizontal height of first feature is higher than the second feature. The first feature is "downward", "below" and "under" the second feature may include that the first feature is directly above and obliquely above the second feature, or simply means that the horizontal height is less than the second feature.

In the description of the disclosure, the reference terms "one embodiment", "some embodiments", "example", "specific example", "some examples" and etc., may refer to that the specific features, structures, materials or characteristics described by combining the embodiment or example included in at least one embodiment or example. In the specification, schematic statement of the terms does not necessarily refer to the same embodiment or example. In addition, the described specific features, structures, materials, or characteristics may be combined in anyone or more embodiments or examples in an appropriate manner.

Although the embodiments of the invention have been shown and described above, it is understood that the embodiments described above are illustrative and are not to limit the scope of the invention, any changes, modifications, replacements and variations of above embodiments may be made by those skilled in the art without departing from the principle and spirit of the invention, should be included in the protection scope of the invention.

The invention claimed is:

1. A remotely operated pneumatic manipulator based on Kinect, comprising Kinect sensor (1), computer (2), D/A embedded board (3), PWM (Pulse Width Modulation) piezoelectric pneumatic ratio valve (4), pneumatic triad (5), air compressor (6), artificial muscle (7), spring (8) and finger joint (9), wherein the Kinect sensor (1) is provided on one side of the finger joint (9), a camera module of the Kinect sensor (1) is faced to the finger joint (9), input/output interface of the Kinect sensor (1) is electrically connected to the computer (2), input interface of the D/A embedded board (3) is electrically connected to the computer (2), and output interface of the D/A embedded board (3) is electrically connected to one end of proportional amplifier of the PWM piezoelectric pneumatic ratio valve (4), the PWM piezoelectric pneumatic ratio valve (4) adopts a three position five-way valve, pneumatic input interface of the PWM piezoelectric pneumatic ratio valve (4) is connected to the pneumatic triad (5) by tube, input interface of the pneumatic triad (5) is connected to the air compressor (6), the artificial muscle (7) adopts pneumatic muscle, pneumatic output interface of the PWM piezoelectric pneumatic ratio valve (4) is connected to the artificial muscle (7) by flexible pipe, the other end of the artificial muscle (7) is connected to the finger joint (9) of the manipulator by rope, the spring (8) is arranged in internal groove of the finger joint (9), two ends of the spring (8) are connected to and fixed with a convex in the groove by compression, each finger joint (9) is independently arranged, and each finger joint (9) is correspondingly equipped with PWM piezoelectric pneumatic ratio valve (4), artificial muscle (7), and spring (8).

2. The remotely operated pneumatic manipulator based on Kinect of claim 1, wherein the finger joints (9) of the pneumatic humanoid manipulator are designed using 3D printing technology, and the manipulator adopts the artificial muscle-FluidicMuscle of Festo.

3. The remotely operated pneumatic manipulator based on Kinect of claim 1, wherein each finger joint (9) is provide with a muscle tendon and a spring (8).

4. The remotely operated pneumatic manipulator based on Kinect of claim 1, wherein the computer (2) uses ANFIS algorithm, and the Kinect sensor (1), the computer (2), and the PWM piezoelectric pneumatic ratio valve (4) constitute an overall control system.

\* \* \* \* \*